United States Patent
Sharma et al.

(10) Patent No.: US 9,889,932 B2
(45) Date of Patent: Feb. 13, 2018

(54) METHODS AND SYSTEMS FOR LANDING OF UNMANNED AERIAL VEHICLE

(71) Applicant: Tata Consultancy Services Limited, Mumbai (IN)

(72) Inventors: Hrishikesh Sharma, Bangalore (IN); Balamuralidhar Purushothaman, Bangalore (IN)

(73) Assignee: Tata Consultancy Services Limited, Mumbai (IN)

( * ) Notice: Subject to any disclaimer, the term of this patent is extended or adjusted under 35 U.S.C. 154(b) by 0 days.

(21) Appl. No.: 15/087,298

(22) Filed: Mar. 31, 2016

(65) Prior Publication Data

US 2017/0017240 A1    Jan. 19, 2017

(30) Foreign Application Priority Data

Jul. 18, 2015  (IN) .......................... 2721/MUM/2015

(51) Int. Cl.
*B64C 1/06* (2006.01)
*B64C 39/02* (2006.01)
*G05D 1/06* (2006.01)

(52) U.S. Cl.
CPC .......... *B64C 39/024* (2013.01); *G05D 1/0676* (2013.01); *B64C 2201/14* (2013.01); *B64C 2201/18* (2013.01)

(58) Field of Classification Search
CPC .............. B64C 39/024; B64C 2201/14; B64C 2201/18; G05D 1/0676
USPC ........................................................... 701/4
See application file for complete search history.

(56) References Cited

U.S. PATENT DOCUMENTS

| | | | |
|---|---|---|---|
| 8,301,826 B2 | 10/2012 | Gonzalez et al. | |
| 9,056,676 B1 * | 6/2015 | Wang | .......................... B64F 1/00 |
| 9,067,671 B2 * | 6/2015 | Stark | ...................... G05D 1/101 |
| 9,284,062 B2 * | 3/2016 | Wang | ..................... B64D 39/00 |
| 9,302,783 B2 * | 4/2016 | Wang | .......................... B64F 1/00 |
| 9,412,278 B1 * | 8/2016 | Gong | .................... H04L 63/101 |
| 9,457,915 B2 * | 10/2016 | Wang | ........................ B64F 1/00 |

(Continued)

FOREIGN PATENT DOCUMENTS

| | | |
|---|---|---|
| EP | 2818957 | 12/2014 |
| WO | WO-2014/169353 | 10/2014 |

OTHER PUBLICATIONS

Golubev et al., Analysis of Safety Implications for SJA-Based Robust UAS Flight Control Technology, 2015, IEEE, p. 5D1-1 to 5D1-9.*

(Continued)

*Primary Examiner* — McDieunel Marc
(74) *Attorney, Agent, or Firm* — Finnegan, Henderson, Farabow, Garrett & Dunner LLP (57) ABSTRACT

This disclosure relates generally to Unmanned Aerial Vehicle (UAV), and more particularly to system and a method for landing of an Unmanned Aerial Vehicle (UAV). In one embodiment, the method includes estimating a 3-dimensional (3D) location of at least one media sensor mounted on the UAV relative to a marker representative of a landing location of the UAV. The marker comprises a recursive geometrical pattern. The landing of the UAV on the marker at the landing location is facilitated based on the 3D location of the at least one media sensor mounted on the UAV relative to the marker.

18 Claims, 5 Drawing Sheets

(56) References Cited

U.S. PATENT DOCUMENTS

| | | | |
|---|---|---|---|
| 9,513,635 B1* | 12/2016 | Bethke | G05D 1/042 |
| 9,573,684 B2* | 2/2017 | Kimchi | B64C 39/024 |
| 9,573,701 B2* | 2/2017 | Beardsley | B60L 11/1816 |
| 2007/0250260 A1 | 10/2007 | Ariyur et al. | |
| 2009/0306840 A1 | 12/2009 | Blenkhorn et al. | |

OTHER PUBLICATIONS

Angelino et al., UAV Position and Attitude Estimation using IMU, GNSS and Camera, 2012, IEEE, p. 735-742.*

Mokhtari et al., Dynamic Feedback Controller of Euler Angles and Wind parameters estimation for a Quadrotor Unmanned Aerial Vehicle, 2004, IEEE, p. 2359-2366.*

Brockers, R. et al. (2012) "Fully Self-Contained Vision-Aided Navigation and Landing of a Micro Air Vehicle Indepdendent from External Sensor Inputs," *Unmanned Systems Technology XIV*; 10 pages.

Brockers, R. et al. (2011). "Autonomous landing and ingress of micro-air-vehicles in urban environments based on monocular vision," *Micro- and Nanotechnology Sensors, Systems, and Applications III*: 12 pages.

Masselii, A. et al. "A Novel Marker Based Tracking Method for Position and Attitude Control of MAVs," *Proceedings of International Micro Air Vehicle Conference and Flight Competition (IMAV)*, Jul. 2012; 6 pages.

Shakernia, O. et al. "Vision Guided Landing of an Unmanned Aerial Vehicle," *Proceedings of the 38$^{th}$ IEEE Conference on Decision and Control—CDC*; 1999; 8 pages.

* cited by examiner

METHODS AND SYSTEMS FOR LANDING OF UNMANNED AERIAL VEHICLE

PRIORITY CLAIM

This U.S. patent application claims priority under 35 U.S.C. § 119 to: India Application No. 2721/MUM/2015, filed on Jul. 18, 2015. The entire contents of the aforementioned application are incorporated herein by reference.

TECHNICAL FIELD

This disclosure relates generally to unmanned aerial vehicle (UAV), and more particularly to vision-based landing of UAV based on a recursive marker.

BACKGROUND

In general, a UAV is an aircraft which flies without a human pilot on-board. A UAV recognizes a path of flight thereof based on programmed instructions provided to the UAV by a remote control station or by UAV embedded controllers. With advancement in aviation technology, utilization of UAVs, also known as "drones", for various urban civilian and rural civilian applications is increasing. For example, the UAV is being utilized for urban civilian applications such as surveillance, fire brigades, disaster control, emergency response crews, while remote rural civilian applications include periodic monitoring of long linear infrastructures towards critical utilities, such as power line, oil/gas pipelines, and so on. Other advanced applications of UAVs usage include weather observation, topographical survey, and various military applications.

In order to assist a UAV in landing, various techniques have been implemented. For example, an external controller is employed that may assist the UAV to land at a particular point or location. In certain scenarios, such point/location is identified by implementing a marker based technique, wherein a marker such as an "H" shaped marker or a marker having concentric rings may be placed at the landing location. The UAV includes a camera that is configured to identify the marker and land thereon.

The inventors here have recognized several technical problems with such conventional systems, as explained below. In a marker based technique, for the camera to accurately detect the marker, the marker should be fully within the camera field of view (FOV) so that it can be fully imaged and identified. Moreover, when the UAV is on a descend path, the image of the marker as captured by the camera keeps changing, thereby rendering the detection of the marker inefficiently.

SUMMARY

Embodiments of the present disclosure present technological improvements as solutions to one or more of the above-mentioned technical problems recognized by the inventors in conventional systems. For example, in one embodiment, a system for landing of a (UAV) is provided. The system includes at least one media sensor; at least one memory; and one or more hardware processors. The at least one memory is coupled to the one or more hardware processors. The one or more hardware processors are capable of executing programmed instructions stored in the at least one memory to estimate a 3D location of at least one media sensor mounted on the UAV relative to a marker representative of a landing location of the UAV. The marker includes a recursive geometrical pattern. Further, the one or more hardware processors are capable of executing programmed instructions to facilitate landing of the UAV on the marker based on the 3D location of the at least one media sensor mounted on the UAV relative to the marker.

In another embodiment, a processor-implemented method for landing of a UAV is provided. The method includes estimating, via one or more hardware processors, a 3D location of at least one media sensor mounted on the UAV relative to a marker representative of a landing location of the UAV. The marker includes a recursive geometrical pattern. Further, the method includes, facilitating, via the one or more hardware processors, landing of the UAV on the marker based on the 3D location of the at least one media sensor mounted on the UAV relative to the marker.

In yet another embodiment, a non-transitory computer-readable medium having embodied thereon a computer program for executing a method for landing of a UAV is provided. The method includes estimating a 3D location of at least one media sensor mounted on the UAV relative to a marker representative of a landing location of the UAV. The marker comprising a recursive geometrical pattern. Further, the method includes facilitating landing of the UAV on the marker at the landing location based on the 3D location of the at least one media sensor mounted on the UAV relative to the marker.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
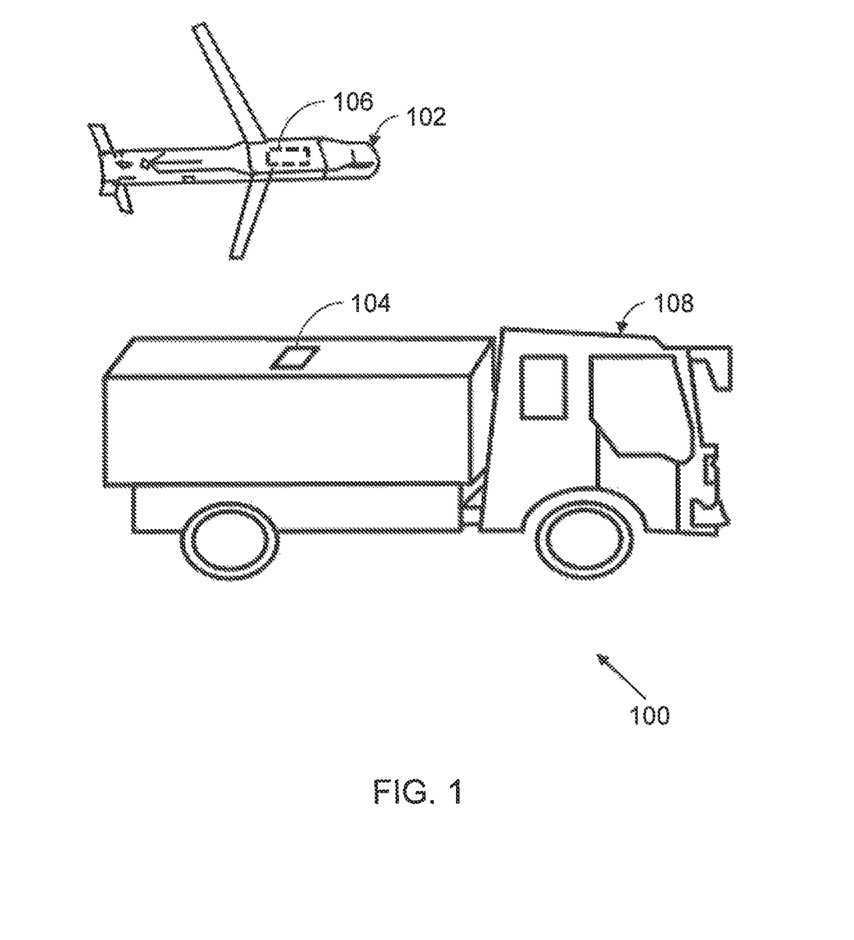
FIG. 1 illustrates an exemplary representation of landing of a UAV at a landing location, in accordance with embodiment of the present disclosure.

FIG. 1 illustrates an example representation 100 of landing of a UAV 102, in accordance with embodiment of the present disclosure. The representation of landing of the UAV 102 is shown to include the UAV 102 that is capable of detecting a marker, for example a marker 104. In an embodiment, the UAV detects the marker by utilizing vision based techniques. In an embodiment, the UAV includes at least one media sensor (or a camera embodying at least one media sensor) for detecting the marker. For example as illustrated in FIG. 1, the UAV 102 is shown to include at least one media sensor 106. In an embodiment, the at least one media sensor 106 (or the camera) is downward-looking completely, so as to effectively project the marker.

The marker herein is representative of a landing location of the UAV 102. In an embodiment, the landing location of the UAV may include a static surface such as a plane ground surface on which the marker may be configured. For example, a patch of a land may be cleared and the marker may be printed on the cleared patch. In another embodiment, the landing location of the UAV may be on a vehicle. For instance, the marker may be configured on a platform located on a vehicle. Such a vehicle that holds a marker indicative of landing point of the UAV is known as a ground vehicle (GV). An example GV, for example, a GV 108 holding a marker 104 is illustrated in FIG. 1. The GV maybe in a moving condition or a static condition. Such a system having the GV (comprising the marker) along with the UAV is referred to as a hybrid platform. The hybrid platform is useful in scenarios where, for example, ground vehicle can carry many accessories which may be required for various types of recoveries, while the UAV may be limited in terms of amount of payload it can carry.

In an embodiment, the marker may include a pattern that can be detected by the UAV. In an embodiment, the marker includes a recursive geometrical pattern that is self-similar. Herein, the term 'self-similar pattern', may refer to a pattern that is similar to itself at any scale, as well as a part of itself. The similarity of the pattern to itself at any scale is in form of geometrical properties being exactly or approximately the same in terms of congruence. In an embodiment, the recursive geometrical pattern includes a recursive fractal pattern. A fractal is a mathematical set that exhibits a repeating pattern in a self-similar manner that displays at every scale. Different types of fractals may either be exactly or nearly the same at different levels. An example of the recursive fractal pattern is a Sierpinski fractal pattern. The Sierpinski fractal pattern includes a plurality of polygons that are self-similar or similar in shape. For example, the plurality of polygons may be of square shape, triangle shape, and so on. It will be understood that a polygon included in the recursive geometrical shape may be of any shape that includes all the sides of equal length. In order to configure a Sierpinski fractal pattern marker, a polygon shaped object is embedded multiple times at appropriate locations at various scales within a topmost object in the marker. Herein, the term 'scale' refers to the size of the polygon. As such, "the size of plurality of polygons belonging to various distinct scales" refers to a set of distinct sizes of the polygons. The number of scales at which the object is embedded is known as the order of the pattern. An example of a Sierpinski fractal pattern marker with a square as the polygon is illustrated and explained further with reference to FIG. 3.

The resemblance of a fractal to a part of itself facilitates in the locating and recognizing the marker when only a part of the marker is detected/imaged during flight/descend of the UAV. In addition, similarity of the geometrical polygonal shape at arbitrary scales to itself in the marker facilitates in capturing frames that have fixed-width pattern inside, during descend of the UAV at certain fixed discrete set of altitudes. Due to these advantages, the fractal pattern can be utilized for facilitating landing of the UAV even when the GV on which the marker is disposed is in motion (or is mobile).

In an embodiment, the descending of the UAV is controlled by continuously (at a particular frequency) estimating the 3D location of the UAV with respect to the marker. In an embodiment, the UAV 102 is configured to detect the marker by using vision based sensing techniques. In an embodiment, the UAV includes at least one media sensor configured thereon for detecting the marker by capturing images/frames of the marker. The captured frames can be utilized for estimating 3D location of the UAV with respect to a centroid of the marker during descend. Hereinafter the 3D location of the UAV with respect to a centroid of the marker during descend may be referred to as 'relative 3D location'. In an embodiment, the relative 3D location may be used to control a speed of the UAV, an immediate heading position of the UAV during the flight/descend, and other such factors, thereby facilitating in landing of the UAV on the marker (even when the marker is configured on a moving GV).

In an embodiment, the 3D location of the UAV at any instant may be used to determine/estimated altitude of the UAV at that instant. The estimated altitude may further be utilized for determining a descend path of the UAV towards the marker. For example, the 3D position of the UAV may further facilitate in determining the altitude in real-time of the UAV, thereby enabling in estimating an immediate heading position (or the descend path) of the UAV. In an embodiment, the estimation of the 3D position of the UAV can be utilized in calculating controlled instantaneous speeds of the UAV during descend. In an example embodiment, a system is provided for facilitating the landing of the UAV at the landing point. An example implementation of the system for estimating the relative 3D location of the UAV and facilitating the landing of the UAV at the landing point is explained further with reference to FIG. 2.

Figure 2:
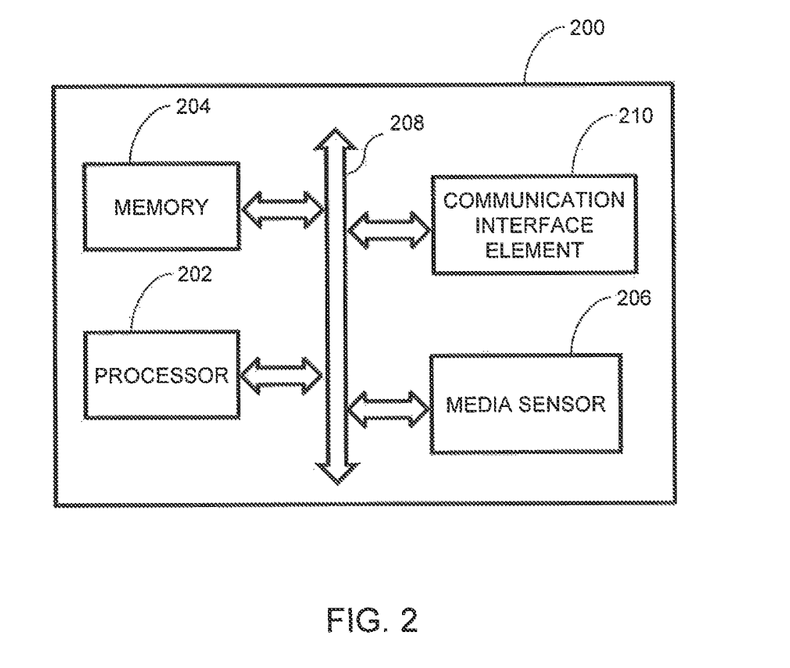
FIG. 2 illustrates a functional block diagram of a system for facilitating landing of a UAV, according to some embodiments of the present disclosure.

FIG. 2 illustrates a block diagram of a system 200 for facilitating landing of a UAV, in accordance with an embodiment of the present disclosure. In an embodiment, the system 200 facilitates in landing of the UAV by utilizing vision based techniques. For example, the system stores an image of a marker that is representative of a landing location of the UAV. Such a stored image of the marker may hereinafter be referred to as 'stored marker image'. The system 200 may further facilitate in capturing an image (hereinafter referred to as 'captured marker image') of the marker at any instant from an altitude and align the stored marker image with the captured marker image based on the respective centroids of the captured marker image and the stored marker image. Once the stored marker image is aligned with the captured marker image, the system 200 may be caused to determine the 3D location and/or altitude of the UAV relative to the marker, and based on the relative altitude, the system 200 may initiate and/or facilitate descend of the UAV.

The system 200 includes or is otherwise in communication with one or more hardware processors such as a processor 202, at least one memory such as a memory 204, and at least one media sensor such as media sensor 206. In an embodiment, the processor 202, memory 204, and the memory 204, and the media sensor 206 may be coupled by a system bus such as a system bus 208 or a similar mechanism.

The processor 202 may include circuitry implementing, among others, audio and logic functions associated with the communication. For example, the processor 202 may include, but are not limited to, one or more digital signal processors (DSPs), one or more microprocessor, one or more special-purpose computer chips, one or more field-programmable gate arrays (FPGAs), one or more application-specific integrated circuits (ASICs), one or more computer(s), various analog to digital converters, digital to analog converters, and/or other support circuits. The processor 202 thus may also include the functionality to encode messages and/or data or information. The processor 202 may include, among other things, a clock, an arithmetic logic unit (ALU) and logic gates configured to support operation of the processor 202. Further, the processor 202 may include functionality to execute one or more software programs, which may be stored in the memory 204 or otherwise accessible to the processor 202.

The at least one memory such as a memory 204, may store any number of pieces of information, and data, used by the system to implement the functions of the system. For example, in an example embodiment, the memory 204 is configured to store an image (hereinafter referred to as 'stored marker image') of the marker. The memory 204 may include for example, volatile memory and/or non-volatile memory. Examples of volatile memory may include, but are not limited to volatile random access memory (RAM). The non-volatile memory may additionally or alternatively comprise an electrically erasable programmable read only memory (EEPROM), flash memory, hard drive, or the like. Some examples of the volatile memory includes, but are not limited to, random access memory, dynamic random access memory, static random access memory, and the like. Some example of the non-volatile memory includes, but are not limited to, hard disks, magnetic tapes, optical disks, programmable read only memory, erasable programmable read only memory, electrically erasable programmable read only memory, flash memory, and the like. The memory 204 may be configured to store information, data, applications, instructions or the like for enabling the UAV to carry out various functions in accordance with various example embodiments. Additionally or alternatively, the memory 204 may be configured to store instructions which when executed by the processor 202 causes the UAV to behave in a manner as described in various embodiments.

In an embodiment, the media sensor 206 may include an image capturing module, such as a camera, video and/or audio module, in communication with the processor 202. The media sensor 206 may be any means for facilitating capturing images, video and/or audio for storage, display, or transmission. For example, in an exemplary embodiment in which the media sensor 206 may be embodied in a camera, such that the camera may be configured to form and save a digital image file from an image of the marker captured by the camera. The media sensor 206 may include hardware such as a CMOS/CCD (complementary metal-oxide semiconductor/charged coupled device) sensors configured for capturing images. In an embodiment, the media sensor may be configured to capture media items in accordance with a number of capture settings such as focal length, zoom level, lens type, aperture, shutter timing, white balance, color, style (e.g., black and white, sepia, or the like), picture quality (e.g., pixel count), flash, date, time, or the like. In some embodiments, the values of the capture settings (e.g., degree of zoom) may be obtained at the time a media item comprising the marker image is captured and stored in association with the captured media item in a memory device, such as, memory 204. The media sensor 206 can include all hardware, such as circuitry, a lens or other optical component(s), and software for creating a digital image file from a captured image.

In some example embodiments, the image sensor may include only the hardware needed to view an image, while a memory device, such as the memory device of the system 200 stores instructions for execution by the processor 202 in the form of software to create a digital image file from a captured image. In an exemplary embodiment, the media sensor 206 may further include a processor or co-processor which assists the processor 202 in processing image data and an encoder and/or decoder for compressing and/or decompressing image data. The encoder and/or decoder may encode and/or decode according to, for example, a joint photographic experts group (JPEG) standard or other format.

In an example embodiment, the system 200 may be embodied in the UAV. In another embodiment, the system 200 may partially be implemented in the UAV and partially at the landing location. For example, in case the landing location of the UAV is on a GV (as is illustrated in FIG. 1), the measurements performed by the sensors configured on the GV as well as the captured images of the marker may be transmitted wirelessly to a Ground Control Station (GCS) configured on/within the GV, where the estimation is performed and transmitted back to the UAV in real-time. In this embodiment, the system 200 may include a communication interface element 210 to facilitate communication between the UAV and the GCS. The communication interface element 210 may be in form of a wireless connection or a wired connection. Examples of communication interface element 210 may include, but are not limited to, IEEE 802.11 (Wifi), BLUETOOTH®, or a wide-area wireless connection. Example of wired network interface element 210 includes, but is not limited to Ethernet. The processor 202 may also be configured to facilitate communications via the communications interface element 210 by, for example, controlling hardware included within the communications interface element 210. In this regard, the communication interface element 210 may include, for example, communications driver circuitry (e.g., circuitry that supports wired communications via, for example, fiber optic connections), one or more antennas, a transmitter, a receiver, a transceiver and/or supporting hardware, including, for example, a processor for enabling communications.

In an embodiment, for a UAV to be able to start descend from a comfortable altitude, the marker should be properly imaged by the media sensor, and the image of the marker should be provided to the processor for enabling descend of the UAV. Also, for the media sensor to properly image the marker from that altitude, the marker should be captured within a predetermined threshold size of a bounding box by the media sensor. Similarly, given the size of a landing pad/location and the marker patter within the landing location, there is a maximum altitude till which point useful estimation of location can be done.

In an example embodiment, the processor 202 is configured to, with the content of the memory 204, and optionally with other components described herein, cause the system 200 to detect the marker representative of the landing location of the UAV by scanning the landing location. In an embodiment, detecting at least one portion of the marker includes capturing an image of the at least one portion of the marker containing at least one complete polygon of the marker. In an embodiment, the camera (or the at least one media sensor) may be installed downward-looking on the UAV so as to properly scan and capture image of the marker.

The system 200 may be caused to scan the landing location and detect an object that may potentially be the marker. In order to ascertain that the detected object is the marker, the system 200 is caused to perform a connected component analysis (CCA) on the detected object. In an embodiment, for performing CCA, distinct polygons of a plurality of self-similar polygons of the marker may be assumed to be the components. An example of detecting the marker is explained below by considering the marker as a Sierpinski fractal carpet pattern having a plurality of squares. Also, an example of the Sierpinski fractal carpet is illustrated and described with reference to FIG. 3.

In an embodiment, for detecting the Sierpinski fractal carpet pattern marker, a CCA is performed by the system 200 on a detected object which may potentially include the pattern. The system 200 is caused to perform a 'squareness check' on the components of the detected object. Herein, the term 'squareness check' may refer to determining and ascertaining whether the components of the detected object are squares or not. In an example embodiment, the squareness check may be performed for each component by detecting corners of the component, determining number of corners of the component, checking a ratio of a blob area to blob boundary for the component, determining whether the angles near the corner of a bounding box of the component is around 90° or not, and so on. Herein, the blob may refer to regions emerging within the image after CCA, corresponding to various objects. It will be noted that herein only a few of the criteria for determining the squareness of the components are disclosed. However, the squareness of the components may be determined by various other parameters or combination thereof with these mentioned parameters without limiting the scope of various embodiments. The components meeting the squareness criteria may be sorted into a sequence, and the sequence may be sorted to store the components with decreasing area thereof.

As an example, a blob is considered in the detected marker and an orientation of the blob is determined. Also, an x-y axis is defined from the centroid of the blob. If in the sorted sequence, 8 more squares are found as next successive items of list, having area around ⅑th of this blob, then for each such square, it is determined whether the centroid of this square is along with the direction defined by extended 8-neighborhood of the centroid of this image, at same distance from the current blob's centroid, as the distance noted for neighboring squares are considered till all the iterations are complete. In an embodiment, all the iteration are completed once the count of the detected squares is at most $(8^n+8^{(n-1)}+ \ldots +1)$ and at least $(3^n+3^{(n-1)}+ \ldots +1)$. Herein, the least number corresponds to detecting all squares along the boundary of the marker, plus a central square which may be biggest in size.

In an embodiment, once the marker is detected by the system 200, the processor 202 is further configured to, with the content of the memory 204, and optionally with other components described herein, cause the system 200, to estimate a 3D location of the UAV relative to the marker. In particular, the system 200 is caused to determine the 3D location of the UAV relative to the centroid of the marker at the landing location. In an embodiment, the centroid may be determined based on the size of the plurality of polygons in the recursive geometrical pattern of the marker. In particular, the centroid may be determined as the central portion of the single biggest polygon detected while detecting the marker. For example, in case of a Sierpinski fractal pattern marker, the centroid may be the central portion of the single biggest square.

In an example embodiment, the processor 202 is further configured to, with the content of the memory 204, and optionally with other components described herein, cause the system 200, to estimate 3D orientation of the at least one media sensor with respect to the centroid of the marker. In an embodiment, the 3D orientation of the at least one media sensor with respect to the centroid of the marker may be determined by utilizing vision based techniques. In an embodiment, the orientation of the at least one media sensor with respect to the centroid of the marker the system 200 may be caused to align and compare the stored marker image in the system 200 with the captured marker image to determine a correspondence between the captured marker image and the stored marker image. In an example embodiment, the system 200 is further caused to compute an altitude of the UAV based on the correspondence between the images. In an embodiment, a plurality of altitude values may be computed from each individual correspondence between different polygons of the plurality of polygons of the stored marker image and the captured marker image, and a mean/median/mode of the plurality of altitude values may be calculated from each individual correspondence to determine the altitude of the UAV in a robust manner.

In certain scenarios, for example due to UAV motion or other noise conditions, the media sensor may not be able to capture image of the marker completely. In an example embodiment, an image of the marker may be deemed partial marker if the central, biggest polygon cannot be detected. In such a scenario, the system 200 may be caused to track only a partial image of the marker, and extrapolate partially detected marker image into complete marker image, so that the centroid of the marker can be estimated. In an example embodiment, the system may be caused to extrapolate the partially detected marker image based on a color code associated with the polygons detected in the partially detected marker image. In particular, for determining the level information and orientation information associated with each of the plurality of polygons of the partially captured marker image, each polygon may be color-coded with a unique color and a corresponding color value, such that the color and the corresponding color value of each of the partially captured marker image may uniquely include an orientation information and an order information associated with that polygon embedded therein. In an embodiment, the color and the corresponding color value of each of the polygons may be stored in a pre-established list of colors. In an embodiment, the pre-established list of colors may be stored in a memory, for example the memory 204 of the system 200. Accordingly, even if one polygon of the plurality of polygons is detected in the imaged marker and the system 200 is caused to correspond the detected polygon to one unique polygon in the stored marker image, the polygon can be extrapolated to generate the complete marker image. It will be noted herein, that more number of polygons are detected and the correspondences are established, the lesser is the estimation error of the centroid. An example of detecting the partial marker image and extrapolating the partial marker image based on the color coding of the individual polygons of the marker is described below.

In an embodiment, for extrapolating the partially captured marker image, the system performs a CCA on a set of polygons captured in the partially captured marker image. Herein, the individual polygons of the set of polygons may be referred to as components. The system 200 is caused to perform a 'check' on the individual components to determine whether the individual component is a polygon or not. In an example embodiment, the check may be performed for each component by detecting corners of the component, determining number of corners of the component, checking a ratio of a blob area to blob boundary for the component, determining the angles near the corner of a bounding box of the component, and so on. It will be noted that herein only a few of the criteria for checking the shape of the components are disclosed. However, the check of the components may be determined by various other parameters or combination thereof with these mentioned parameters without limiting the scope of various embodiments. The components meeting the criteria of the check may be sorted into a sequence, and the sequence may be sorted to store the components with decreasing area thereof. For each polygon that is stored in the sequence, a color value associated with a color of the polygon is determined and a search is performed for determining a mapping between the determined color value and color values stored in the pre-established list of colors. In an embodiment, on detecting a mapping, the polygon corresponding to the mapped color value along with corresponding color information (having the order information and the orientation information) is identified in the stored marker image. Based on the order information and the orientation information of the polygon in the stored marker image, a location of the centroid of the stored marker image is estimated. In an embodiment, the location of the centroid is estimated in the stored marker image based on the orientation (and/or location) of the polygon with respect to the marker and the order of the polygon. In an embodiment, the location of the centroid may be determined based on the following expression:

Location of centroid of a polygon=$i$*unit distance in each of ($K^n$/2) directions where, n is a known order number of the marker, K is the number of sides of the polygon, and i is the order of the polygon under consideration.

The color mapped polygons may be stored in a sequence, and the sequence may be sorted to store the color mapped polygons in order of decreasing area. A blob is considered and an orientation of the blob is determined, and x,y axis is defined from the centroid of the blob. If in the sorted list, few more polygons are found as next successive items of list, having area around $1/(9^i)^{th}$ of this blob (where, i=1 to n, and where n is the known order of the marker) of this blob, then for each such polygon, it is determined whether the centroid of this polygon is along with the direction defined by extended k-neighborhood of the centroid of this image, at same distance from the current blob's centroid, as the distance noted for neighboring polygons considered till all the iterations are complete. In an embodiment, all the iteration are completed once the count of the detected polygons is at most ($8^n+8^{(n+1)}+ \ldots +1$), and a location of the centroid is estimated in each of the iteration. In an embodiment, the location of the centroid is computed by taking a mean/media/mode of the values of the centroid location estimated from all the iterations. The location of the centroid that is estimated from all the iterations is utilized for detecting relative 3D location and orientation of the camera (media sensors) and/or the UAV with respect to the marker at the landing location. In addition, the estimated location of the centroid facilitates in determining the altitude of the UAV. An example of determining the altitude of the UAV based on the estimated location of the centroid is explained further with reference to FIG. 5.

In an example embodiment, the processor 202 is further configured to, with the content of the memory 204, and optionally with other components described herein, cause the system 200, to determine a landing path of the UAV based on the altitude of the camera (media sensors). In an embodiment, determining the landing path includes determining an immediate subsequent landing position of the UAV.

Figure 3:
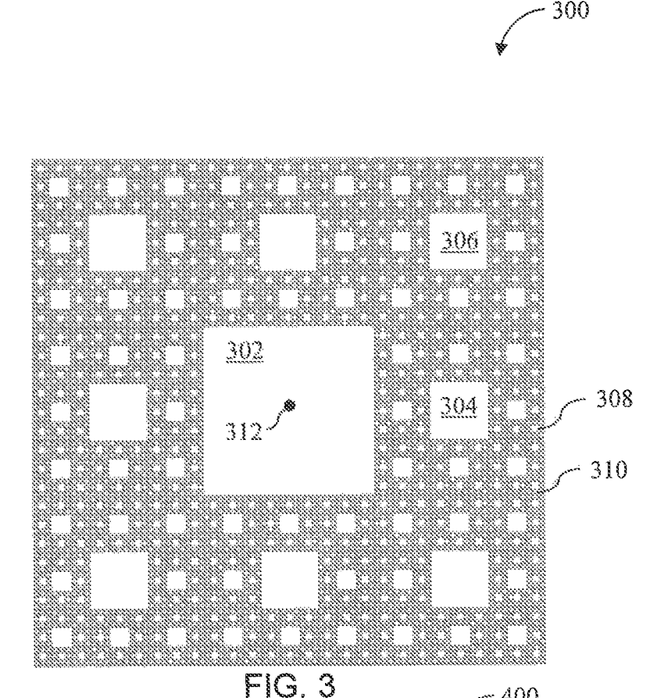
FIG. 3 illustrates an example marker for facilitating landing of a UAV, according to some embodiments of the present disclosure.

FIG. 3 illustrates a marker 300 for facilitating landing of a UAV, in accordance with an embodiment of the present disclosure. The marker illustrated in FIG. 3 is a recursive self-similar fractal patter marker. In particular, the recursive self-similar fractal pattern marker 300 is a Sierpinski Carpet marker pattern. The Sierpinski Carpet marker 300 is a recursive geometrical pattern that is self-similar in nature. In an embodiment, the similarity is in form of geometrical properties being exactly or approximately the same. A self-similar patter, by its definition is similar to itself any scale, as well as a part of itself. For example, as illustrated in FIG. 3, the marker 300 includes a polygonal shape that repeats itself at multiple scales throughout the marker. In the case of Sierpinski Carpet marker 300, the polygonal shape is a square. The square is embedded multiple times at appropriate locations at various scales within a topmost object of the Sierpinski Carpet marker. The Sierpinski Carpet marker 300 includes an arrangement of the square shapes such that the central portion of the marker includes the square 302 of a biggest size as compared to the rest of squares. The number of scales at which the squares are embedded in the object is known as 'order' of the pattern. For example, in the Sierpinski Carpet 300 illustrated in FIG. 3, the order is 5 since the marker includes squares of 5 different sizes, for instance square such as 302, 304, 306, 308, and 310.

As the Sierpinski Carpet marker 300 includes self-similar pattern repeating itself at different scales (meaning squares of different sizes), the Sierpinski Carpet marker 300 enables the at least one media sensor to capture image of the pattern effectively from different altitudes. For example, when the UAV having the at least one media sensor is at a certain altitude, it may be able to capture the image of the Sierpinski Carpet marker 300, however, while descending, the UAV may deviate from a landing path due to environmental conditions or in some scenario the at least one media sensor may not be able to capture the complete marker. In such scenarios, if the media sensors are able to detect even a portion (one or two squares) of the Sierpinski Carpet marker 300, the system (for example, the system 200) is able to extrapolate rest of the Sierpinski Carpet marker pattern, detect the centroid (for example, a centroid 312 of the Sierpinski Carpet marker pattern) thereof. In addition, as the UAV starts the descend, then due to similarity at arbitrary scales to itself (also referred to as self-similarity) it may be possible, at certain fixed discrete set of altitudes, to be able to capture frames that have fixed-width pattern within themselves.

As is explained with reference to FIGS. 1 and 2, the system utilizes the centroid of the marker for detecting the 3D location of camera mounted on the UAV relative to the location of the marker, which in turn is used to determine immediate heading of the UAV. In addition, the detecting the 3D location of camera mounted on the UAV relative to the location of the marker facilitates in continuously controlling the descending of the UAV. Herein, the descending of the UAV is continuously controlled by controlling various kinematics parameters such as the speed, the acceleration, the angle of descend of the UAV, and consequently the landing path followed by the UAV. In an embodiment, on detecting the centroid of the marker (using the captured marker image), the system may facilitate in tracking and aligning the centroid of the stored marker image with the centroid of the captured marker image. In an embodiment, the tracking and aligning of the respective centroids of the captured marker image and the stored marker image may be performed by a Kalman filter embodied in the system (for example, the system 200 of FIG. 2).

Figure 4:
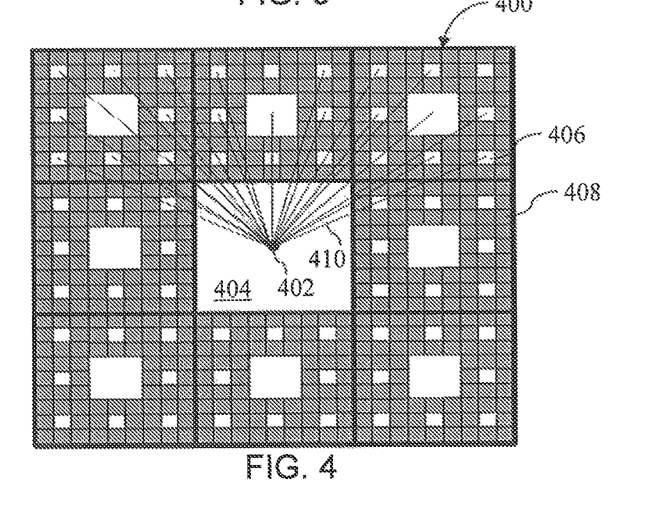
FIG. 4 illustrates an example representation of a marker for facilitating landing of a UAV, according to some embodiments of the present disclosure.

FIG. 4 illustrates an example representation of a marker 400 for facilitating landing of a UAV, in accordance with an example embodiment. In an embodiment, the marker 400 includes a Sierpinski fractal pattern having a plurality of squares with different order and orientations relative to a centroid 402 of the marker 400. Herein, the centroid of the Sierpinski fractal pattern may refer to a central point of the Sierpinski fractal pattern, which also forms the centre of the biggest square of the marker.

As illustrated, various squares such as a square 404 is of the order 1, a square 406 and other squares having the same size as that of the square 406 are of the order 2, a square 408 and other squares having the same size as that of the square 408 are of the order 3, and so on. The orientation of the any square from among the plurality of squares is determined by an orientation of a central point (or centroid) of that square along the centroid 402 (of the biggest size square) of the marker 400. For example the orientation of the square 406 may be determined along a line 410 connecting the centre of the square 406 and the centroid 402.

In an embodiment, the "unit distance" of any square may refer to a distance between the central point of that square along the centroid 402. For example, the unit distance between the square 406 includes the length of a line 410 connecting the centre of the square 406 and the centroid 402. Since the distance a respective central point of any square with reference to the centroid is different for different squares, the unit distance corresponding to each square may be distinct.

Figure 5:
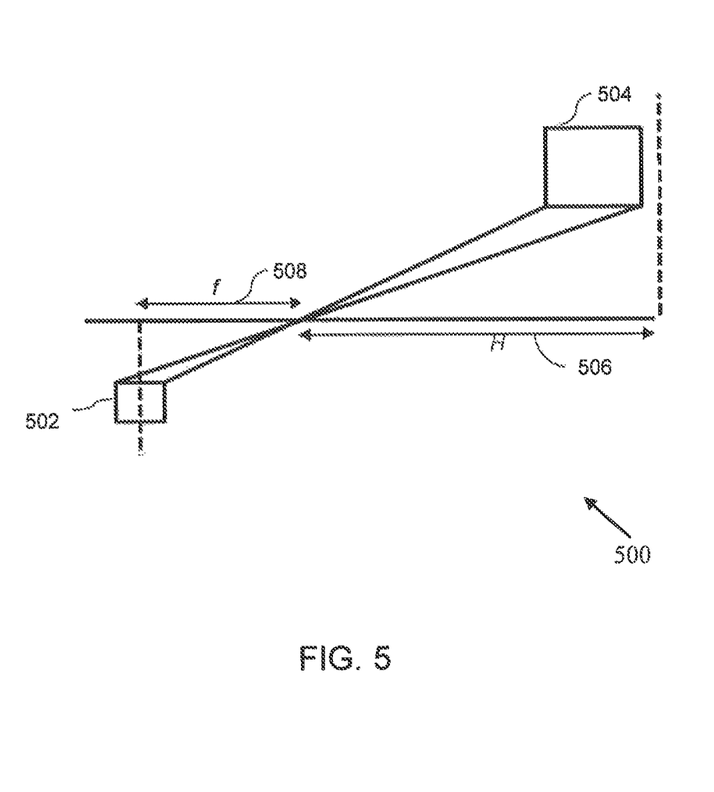
FIG. 5 illustrates an example representation of estimation of an altitude of a UAV, according to some embodiments of the present disclosure.

FIG. 5 illustrates an example representation of estimation of an altitude of a UAV, in accordance with an example embodiment. In an embodiment, the altitude of the UAV may be estimated based on a determination of, for at least one square, values of unit distance in the stored marker image and captured marker image, and a focal length of at least one media sensor utilized for capturing the image of the marker.

Referring to FIG. 5, an example of corresponding squares in a captured marker image and a stored marker image is illustrated. For example, a square 502 may be a square in the stored marker image and a square 504 may be a square in the captured marker image (or /projected marker image in on camera image plane) corresponding to the square 502. Also, the dimensions of the square 504 are represented by 'B', and dimensions of the square 502 are represented by '$d_{ip}$'. In an embodiment, the altitude (H) 506 of the UAV may be determined based on the following equation (1):

$$d_{ip}/f = B/H, \quad (1)$$

where, f (represented as 508) is the focal length of the camera (or a device) embodying the at least one media sensor.

As is seen, in the equation (1), all the quantities such as $d_{ip}$, B and f are known, and thus the value of altitude (H) of the UAV at any instant can be determined.

As is seen above, for determination of the altitude of the UAV in case of a partial image capture, a unit distance associated with at least one polygon is required, meaning thereby that during the partial marker detection at least one polygon should be detected.

Figure 6:
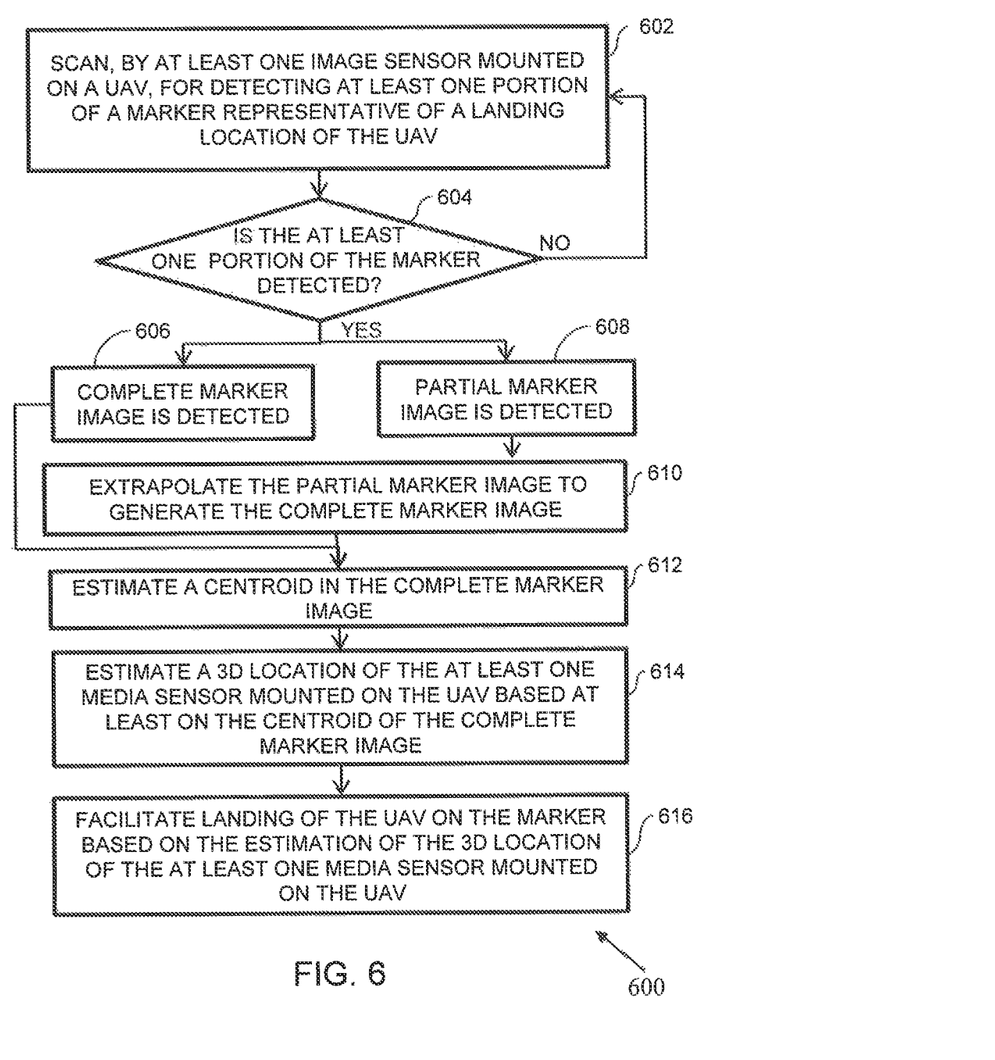
FIG. 6 illustrates a flow diagram of a method for landing of a UAV, according to some embodiments of the present disclosure.

FIG. 6 illustrates a flow diagram of a method 600 for landing of a UAV, in accordance with the present disclosure. At 602, the method includes scanning, by at least one media sensor mounted on the UV, for detecting a marker representative of a landing location of the UV, the marker comprising a recursive geometrical pattern. Herein, the scanning may be performed at a geographical area where the maker may be present. For example, in case of a hybrid platform, the scanning may be performed at the top of a GV which is the location of disposing the marker. In an embodiment, during the scanning, the at least one sensor is configured to capture image of the at least one portion of the detected marker.

At 604, it is determined whether at least one portion of the marker is detected. In an embodiment, the scanning for detecting the at least one portion of the marker is performed at 602, till it is determined at 604 that the at least one portion of the marker is detected. At 606, it may be determined that the at least one portion of the marker is detected. In particular, at 606, the detected at least one portion of the marker includes the complete marker, meaning thereby that during the scanning the complete marker is detected. In an embodiment, the scanning of the complete marker may include imaging the complete marker pattern (for example, the Sierpinski fractal pattern, as described with reference to FIG. 3) to generate a complete marker image or captured marker image.

In another embodiment, it may be determined that only a portion of the marker is detected during the scanning. For example, at 608, it may be determined that a partial marker is detected during scanning. The partial marker pattern may be detected, for example, during noisy conditions or bad weather conditions. In an embodiment, the scanning of the partial marker may include imaging the partial marker to capture a partial marker image. In an embodiment, the partial marker image may be extrapolated to generate the complete marker image, at 610. In an embodiment, the partial marker image may be extrapolated by determining correspondences between the polygons of the captured partial marker image and the polygons of a pre-stored marker image. The stored marker image is the image of the complete marker, and can be stored in the memory of the system (for example, the system 200 shown in FIG. 2).

In an example embodiment, the partial marker image may be extrapolated by determining the color coding assigned to the polygons of the partial marker image, based on the color coding determining the orientation information and order information associated with the polygons of partial marker image. The orientation information and the order information along with a scaling factor may be utilized for extrapolating the partial marker image to generate the complete marker image. The generation of the complete marker image by extrapolating the partial marker image is explained in detail with reference to FIGS. 2-5.

At 612, a centroid of the captured marker image is determined. In an example embodiment, the centroid of the captured marker image may include central portion of the biggest size polygon of the captured marker image. At 614, a 3D location of the at least one media sensor mounted on the UAV is estimated based at least on the centroid of the complete marker image. In an embodiment, for estimating the 3D location of the at least one media sensor, the centroid of the complete marker image may be aligning with the centroid of the pre-stored marker image, and based on the alignment, an altitude of the at least one media sensor is determined. An example of determining the altitude of the at least one media sensor (and hence the altitude of the UAV) is described with reference to FIG. 5.

At 616, landing of the UAV on the marker at the landing location is facilitated based on the estimation of the 3D location of the at least one media sensor mounted on the UAV.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

Various embodiments of the disclosure provide method and system for facilitating landing of a UAV using a marker based landing approach. In particular, the landing of the UAV is facilitated by a marker that is self-similar and repetitive. The system provided herein detection of self-similar marker using vision based techniques. The system for detecting the maker may be configured within the UAV or at a landing location (such as GV). The self-similarity feature of the marker is very advantageous in detecting the marker and landing of the UAV since, this feature enables robust detection of the marker/pattern even during partial image of the marker/pattern is captured. Particularly, even though the altitude of the UAV varies during the descend of the UAV, and the camera mounted on the UAV is able to capture only a portion of the pattern, the system can extrapolate the pattern as the pattern is self-similar and recursive. In addition, the feature of self-similarity of the recursive pattern enables robust detection of the marker and a smooth landing of the UAV, even when the GV is in motion (or mobile condition) and is a size-constrained surface such as truck-top. Moreover, the disclosed system takes care of any false positive, i.e. a detected polygon that does not form part of a pattern/marker is not detected.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor-implemented method for landing of an Unmanned Aerial Vehicle (UAV), the method comprising:
   estimating, via one or more hardware processors, a 3-dimensional (3D) location of at least one media sensor mounted on the UAV relative to a marker representative of a landing location of the UAV, the marker comprising a recursive geometrical pattern, and wherein the recursive geometrical pattern comprises a recursive fractal pattern; and
   facilitating, via the one or more hardware processors, landing of the UAV on the marker at the landing location based on the 3D location of the at least one media sensor mounted on the UAV relative to the marker.

2. The method of claim 1, wherein the recursive fractal pattern comprises a Sierpinski fractal pattern.

3. The method of claim 2, wherein the recursive fractal pattern comprises a plurality of polygons, the plurality of polygons being self-similar, wherein size of each polygon of the plurality of polygons is from among a set of preconfigured sizes.

4. The method of claim 3, further comprising performing a scanning, by the at least one media sensor mounted on the UV, to detect at least one portion of the marker, wherein detecting the at least one portion of the marker comprises capturing an image of the at least one portion of the marker containing at least one complete polygon.

5. The method of claim 4, wherein the at least one portion of the marker comprises a complete marker pattern, and the image of the at least one portion of the marker comprises an image of the complete marker pattern, and wherein estimating the 3D location of the at least one media sensor relative to the marker comprises:
   determining a centroid of the complete marker pattern based on the size of the plurality of polygons in the complete image;
   determining a 3D orientation of the at least one media sensor relative to the centroid of the complete marker pattern; and
   estimating an altitude of the UAV based on the 3D orientation of the at least one media sensor.

6. The method of claim 4, further comprising assigning a distinct color code to each polygon of the plurality of polygons, the color code being indicative of an order and relative orientation of the polygon with respect to a centroid of the marker.

7. The method of claim 6, wherein the at least one portion of the marker comprises a partial marker pattern, and the image of the at least one portion of the partial marker comprises a partial image of the marker having a set of polygons, and wherein estimating the 3D location of the at least one media sensor relative to the marker comprises:
- extrapolating the partial image the marker to generate the complete marker image based on the distinct color coding assigned to each of the polygon within the set of polygons;
- determining a centroid of the complete marker image based on the size of the plurality of polygons in the complete image; determining a 3D orientation of the at least one media sensor relative to the centroid of the complete marker pattern; and
- estimating an altitude of the UAV based on the 3D orientation of the at least one media sensor.

8. The method of claim 1, wherein the landing location comprises a static surface.

9. The method of claim 1, wherein the marker being located on a ground vehicle (GV), the GV is in one of a static condition and mobile condition.

10. A computer implemented system for landing of an Unmanned Aerial Vehicle (UAV), the system comprising:
- at least one media sensor;
- at least one memory; and
- one or more hardware processors, the at least one memory coupled to the at least one processor wherein the at least one processor is capable of executing programmed instructions stored in the at least one memory to:
  - estimate a 3-dimensional (3D) location of the at least one media sensor mounted on the UAV relative to a marker representative of a landing location of the UAV, the marker comprising a recursive geometrical pattern, and wherein the recursive geometrical pattern comprises a recursive fractal pattern; and
  - facilitate landing of the UAV on the marker at the landing location based on the 3D location of the at least one media sensor mounted on the UAV relative to the marker.

11. The system of claimed in claim 10, wherein the recursive fractal pattern comprises a Sierpinski fractal pattern.

12. The system of claim 11, wherein the Sierpinski fractal pattern comprises a plurality of polygons, the plurality of polygons being self-similar, wherein size of each polygon of the plurality of polygons is from among a set of preconfigured sizes.

13. The system of claim 12, wherein the one or more hardware processors are further configured by the instructions to perform a scanning, by the at least one media sensor mounted on the UV, to detect at least one portion of the marker, wherein for detecting the at least one portion of the marker, the one or more hardware processors are further configured by the instructions to capture an image of the at least one portion of the marker containing at least one complete polygon.

14. The system of claim 13, wherein the at least one portion of the marker comprises a complete marker pattern, and the image of the at least one portion of the marker comprises an image of the complete marker pattern, and wherein for estimating the 3D location of the at least one media sensor relative to the marker, the one or more hardware processors are further configured by the instructions to:
- determine a centroid of the complete marker pattern based on the size of the plurality of polygons in the complete image;
- determine a 3D orientation of the at least one media sensor relative to the centroid of the complete marker pattern; and
- estimate an altitude of the UAV based on the 3D orientation of the at least one media sensor.

15. The system of claim 13, wherein the one or more hardware processors are further configured by the instructions to assign a distinct color code to each polygon of the plurality of polygons, the color code being indicative of an order and relative orientation of the polygon with respect to a centroid of the marker.

16. The system of claim 15, wherein the at least one portion of the marker comprises a partial marker pattern, and the image of the at least one portion of the partial marker comprises a partial image of the marker having a set of polygons, and wherein for estimating the 3D location of the at least one media sensor relative to the marker, the one or more hardware processors are further configured by the instructions to:
- extrapolate the partial image the marker to generate the complete marker image based on the distinct color coding assigned to each of the polygon within the set of polygons;
- determine a centroid of the complete marker image based on the size of the plurality of polygons in the complete image;
- determine a 3D orientation of the at least one media sensor relative to the centroid of the complete marker pattern; and
- estimate an altitude of the UAV based on the 3D orientation of the at least one media sensor.

17. The system of claim 10, wherein the marker being located on a ground vehicle (GV), and the GV is in one of a static condition and mobile condition.

18. A non-transitory computer-readable medium having embodied thereon a computer program for executing a method for landing of an Unmanned Aerial Vehicle (UAV), the method comprising:
- estimating a 3-dimensional (3D) location of at least one media sensor mounted on the UAV relative to a marker representative of a landing location of the UAV, the marker comprising a recursive geometrical pattern, and wherein the recursive geometrical pattern comprises a recursive fractal pattern; and
- facilitating landing of the UAV on the marker at the landing location based on the 3D location of the at least one media sensor mounted on the UAV relative to the marker.

* * * * *